(12) United States Patent
Zhi et al.

(10) Patent No.: US 11,036,922 B2
(45) Date of Patent: Jun. 15, 2021

(54) ROUTE INFORMATION INTERACTION METHOD, ELECTRONIC DEVICE, AND COMPUTER STORAGE MEDIUM

(71) Applicant: TENCENT TECHNOLOGY (SHENZHEN) COMPANY LIMITED, Shenzhen (CN)

(72) Inventors: Ran Zhi, Shenzhen (CN); Hairong Wang, Shenzhen (CN); Ning Liu, Shenzhen (CN); Yan Zhao, Shenzhen (CN); Xi Liu, Shenzhen (CN); Bin Jia, Shenzhen (CN); Shaojie Lu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 229 days.

(21) Appl. No.: 15/988,768

(22) Filed: May 24, 2018

(65) Prior Publication Data

US 2018/0267942 A1 Sep. 20, 2018

Related U.S. Application Data

(63) Continuation of application No. PCT/CN2017/071775, filed on Jan. 19, 2017.

(30) Foreign Application Priority Data

Feb. 22, 2016 (CN) .......................... 201610096811.5

(51) Int. Cl.
*G06F 16/23* (2019.01)
*G06F 16/29* (2019.01)
(Continued)

(52) U.S. Cl.
CPC .......... *G06F 40/143* (2020.01); *G01C 21/28* (2013.01); *G01C 21/3664* (2013.01);
(Continued)

(58) Field of Classification Search
CPC .. G06F 17/2247; G06F 16/2329; G06F 16/29; G06F 3/04883; G06F 3/14;
(Continued)

(56) References Cited

U.S. PATENT DOCUMENTS

2008/0086455 A1\* 4/2008 Meisels ................. G01C 21/26
2009/0271104 A1\* 10/2009 Letchner ............ G01C 21/3484
701/532
(Continued)

FOREIGN PATENT DOCUMENTS

CN 103383262 A 11/2013
CN 103955488 A 7/2014
(Continued)

OTHER PUBLICATIONS

The State Intellectual Property Office of the People's Republic of China (SIPO) Office Action 1 for 201610096811.5 Nov. 9, 2018 9 Pages (including translation).
(Continued)

*Primary Examiner* — Philip J Chea
*Assistant Examiner* — Hassan A Khan
(74) *Attorney, Agent, or Firm* — Anova Law Group, PLLC

(57) ABSTRACT

Embodiments of the present invention disclose a route information sharing method and an electronic device. The method includes: collecting a user operation on a first electronic device; in response to the user operation, drawing a first route on a first map displayed on the first electronic device; extracting route information of the first route; based on the route information, determining first location infor-
(Continued)

mation corresponding to Y points on the first route, Y being an integer not less than 2; and providing the first location information for a second electronic device, the first location information being used for the second electronic device to draw, on a second map, a second route corresponding to the first route.

18 Claims, 8 Drawing Sheets

(51) Int. Cl.
G01C 21/28 (2006.01)
G01C 21/36 (2006.01)
G06F 3/0488 (2013.01)
G06F 3/14 (2006.01)
H04L 12/58 (2006.01)
G06F 40/143 (2020.01)

(52) U.S. Cl.
CPC ..... *G01C 21/3676* (2013.01); *G01C 21/3688* (2013.01); *G06F 3/04883* (2013.01); *G06F 3/14* (2013.01); *G06F 3/1454* (2013.01); *G06F 16/2329* (2019.01); *G06F 16/29* (2019.01); *H04L 51/20* (2013.01); *G09G 2356/00* (2013.01); *G09G 2370/022* (2013.01); *H04L 51/10* (2013.01)

(58) Field of Classification Search
CPC ... G06F 3/1454; G01C 21/28; G01C 21/3664; G01C 21/3676; G01C 21/3688; H04L 51/20; H04L 51/10; G09G 2356/00; G09G 2370/022
See application file for complete search history.

(56) References Cited

U.S. PATENT DOCUMENTS

| | | | | |
|---|---|---|---|---|
| 2010/0057346 A1* | 3/2010 | Ehrlacher | ......... | G01C 21/3461 701/533 |
| 2012/0016585 A1* | 1/2012 | Muthuramalingam | ...................... | G06Q 10/10 701/527 |
| 2012/0265433 A1* | 10/2012 | Viola | ................... | G01C 21/362 701/410 |
| 2013/0345978 A1* | 12/2013 | Lush | .................. | G01C 21/3484 701/533 |
| 2015/0160026 A1* | 6/2015 | Kitchel | ................... | G01S 19/13 701/533 |
| 2015/0258380 A1* | 9/2015 | Hoffman | ................ | G16H 40/67 700/91 |
| 2015/0330805 A1* | 11/2015 | Cho | ....................... | H04W 4/02 701/428 |
| 2016/0131493 A1* | 5/2016 | Bostick | .............. | G01C 21/3476 701/537 |
| 2016/0131499 A1* | 5/2016 | Aoki | .................. | G01C 21/3667 701/533 |
| 2016/0320198 A1* | 11/2016 | Liu | ..................... | G01C 21/3438 |
| 2017/0038941 A1* | 2/2017 | Pylappan | ........... | G01C 21/3632 |
| 2017/0215031 A1* | 7/2017 | Harding | ............. | G01C 21/3697 |

FOREIGN PATENT DOCUMENTS

| | | |
|---|---|---|
| CN | 104168298 A | 11/2014 |
| CN | 104618854 A | 5/2015 |
| CN | 104778275 A | 7/2015 |
| CN | 105119800 A | 12/2015 |

OTHER PUBLICATIONS

The State Intellectual Property Office of the People's Republic of China (SIPO) Office Action 2 for 201610096811.5 Feb. 2, 2019 10 Pages (including translation).
The World Intellectual Property Organization (WIPO) International Search Report for PCT/CN2017/071775 Apr. 25, 2017 5 Pages (including translation).

* cited by examiner

First electronic device        Second electronic device

ROUTE INFORMATION INTERACTION METHOD, ELECTRONIC DEVICE, AND COMPUTER STORAGE MEDIUM

CROSS-REFERENCES TO RELATED APPLICATIONS

This application is a continuation application of PCT Patent Application No. PCT/CN2017/071775, filed on Jan. 19, 2017, which claims priority to Chinese Patent Application No. 2016100968115, filed on Feb. 22, 2016, all of which are incorporated by reference in entirety.

FIELD OF THE TECHNOLOGY

The present disclosure relates to the field of information technologies and, in particular, to a route information interaction method, an electronic device, and a computer storage medium thereof.

BACKGROUND OF THE DISCLOSURE

In existing technology, during route sharing, a sharing electronic device usually shares a route on a map to a peer electronic device through social networking software as an image or in HTML5. The peer electronic device displays the route opened as an image or in HTML5. The limitation of such route sharing manner is: if a user wants to view more detailed information of the shared route, for example, intersections that the user will specifically pass, direct enlargement on the image cannot satisfy the user's requirement. If the sharing party wants to modify the shared route, the sharing party needs to re-draw a route and share the route in a form of another image. Obviously, this route sharing operation is complex, the information processing is inflexible, and the sharing effect is poor. For example, when a user guides another user by a route, if the route is shared as an image or in HTML5, the user accepting the sharing can learn only general information of the shared route, but cannot learn detailed information of the route. Thus, this sharing manner obviously cannot achieve a good guiding effect.

SUMMARY

In views of this, embodiments of the present invention provide a route information interaction method and an electronic device, to resolve at least some of the foregoing problems.

One aspect of the embodiments of the present invention provides a route information sharing method. The method include: collecting a user operation on a first electronic device; in response to the user operation, drawing a first route on a first map displayed on the first electronic device; extracting route information of the first route; based on the route information, determining first location information corresponding to Y points on the first route, Y being an integer not less than 2; and providing the first location information for a second electronic device, the first location information being used for the second electronic device to draw, on a second map, a second route corresponding to the first route.

Another aspect of the embodiments of the present invention provides an electronic device. The electronic device: a memory storing instructions; and a processor coupled to the memory. When executing the instructions, the processor is configured for: collecting a user operation on the electronic device; in response to the user operation, drawing a first route on a first map displayed on the electronic device; extracting route information of the first route; based on the route information, determining first location information corresponding to Y points on the first route, Y being an integer not less than 2; and providing the first location information for a remote electronic device, the first location information being used for the remote electronic device to draw, on a second map, a second route corresponding to the first route.

Another aspect of the embodiments of the present invention further provides a non-transitory computer-readable storage medium. The storage medium contains computer-executable instructions for, when executed by one or more processors, performing a route information sharing method. The method includes: collecting a user operation on a first electronic device; in response to the user operation, drawing a first route on a first map displayed on the first electronic device; extracting route information of the first route; based on the route information, determining first location information corresponding to Y points on the first route, Y being an integer not less than 2; and providing the first location information for a second electronic device, the first location information being used for the second electronic device to draw, on a second map, a second route corresponding to the first route.

Other aspects of the present disclosure can be understood by those skilled in the art in light of the description, the claims, and the drawings of the present disclosure.

DETAILED DESCRIPTION

The following further describes the technical solutions of the present disclosure with reference to the accompanying drawings and specific embodiments. It should be understood that the preferred embodiments described below are merely used to illustrate and explain the present disclosure, but are not intended to limit the present disclosure.

Figure 1:
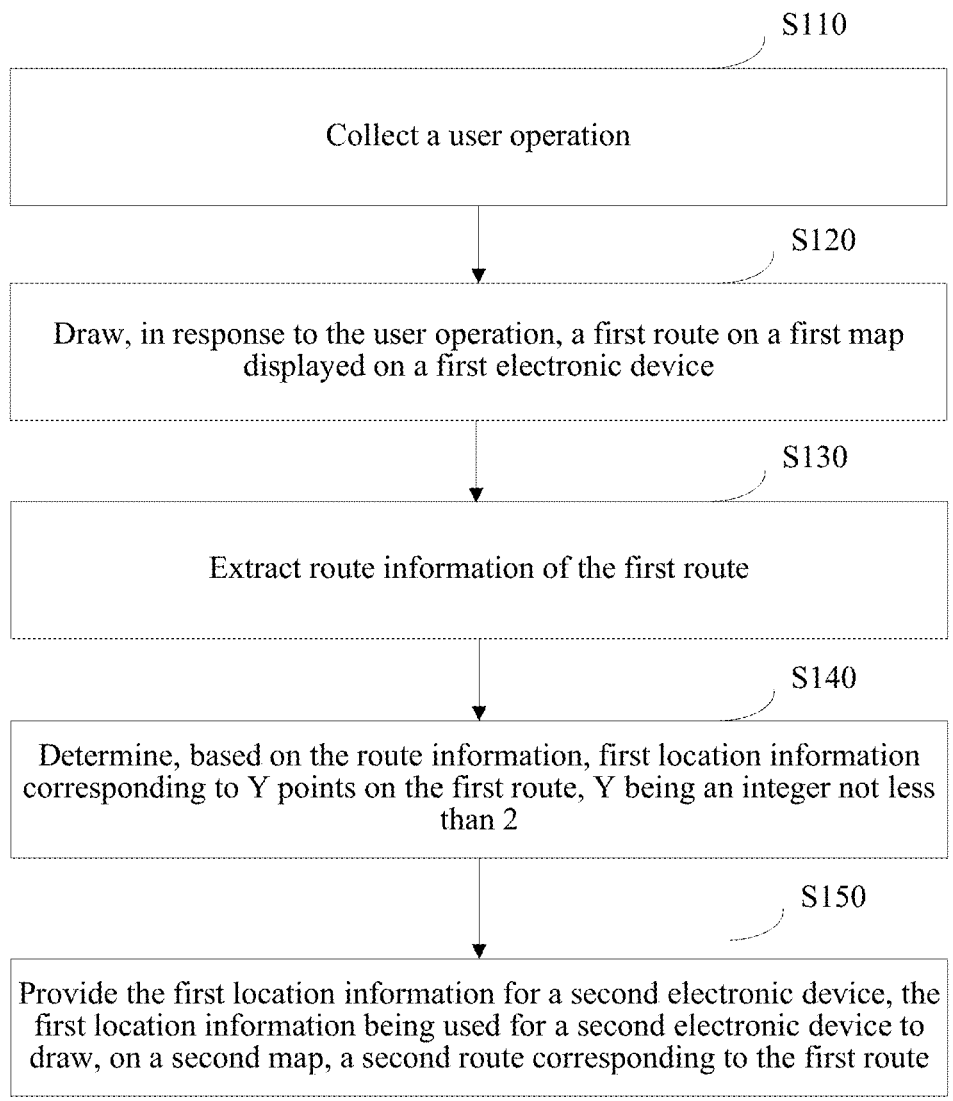
FIG. 1 illustrates a schematic flowchart of a route sharing method according to an embodiment of the present invention.

As shown in FIG. 1, an embodiment provides a route information sharing method. The route information method may be applied to a first electronic device, and includes the followings.

S110: Collecting a user operation.

S120: Drawing, in response to the user operation, a first route on a first map displayed on the first electronic device.

S130: Extracting route information of the first route.

S140: Determining, based on the route information, first location information corresponding to Y points on the first route, where Y is an integer not less than 2.

S150: Providing the first location information to a second electronic device, the first location information being used for the second electronic device to draw, on a second map, a second route corresponding to the first route.

The route information sharing method in one embodiment may be an information exchange method applied to an electronic terminal device. The first electronic device and the second electronic device in one embodiment may be different electronic terminal devices, and the first electronic device and the second electronic device may be electronic terminal devices such as mobile phones, tablet computers, wearable electronic devices, or notebook computers. The electronic terminal devices may exchange information by a network platform. It should be noted that the second electronic device may be an electronic device designated by a user, or may be a non-designated electronic device.

For example, user A and user B are Wechat friends. The user A establishes a sharing group with the user B based on a first map application opening the first map and, in this case, an electronic device held by the user B is the second electronic device. The second electronic device herein is a designated electronic device. Certainly, the second electronic device herein may be a non-designated electronic device. For example, the user A just wants to share the information about the first route by the first electronic device. In this case, the second electronic device is another electronic device connected to the network platform like the first electronic device. In this case, the first electronic device does not designate any electronic device. After receiving the first location information, the network platform may send the first location information to any other electronic device connected to the platform. The any other electronic device herein is a non-designated second electronic device.

The first map in one embodiment may be a map opened by the first map application on the first electronic device. The first route may be a hand-drawn map formed based on an operation from the user on the map, such as a sliding action.

Alternatively, the first route may be a first route formed autonomously by the map application based on a start location and a destination location entered by the user on the first map.

In another embodiment, the user may select a start location, a destination location, and a key location point on a route on the first map, and the first route may be formed by an operation from the user on the map, such as sliding, or the first route may be formed autonomously by the map application according to the selected start location, destination location, and key location point.

In another scenario, the first route may be formed in the following manner: the map application generates a route first and then modifies the route based on an operation from the user such as, sliding or drawing.

In one embodiment, there may be multiple first routes, and/or each of the first routes is an unbroken route.

Figure 2:
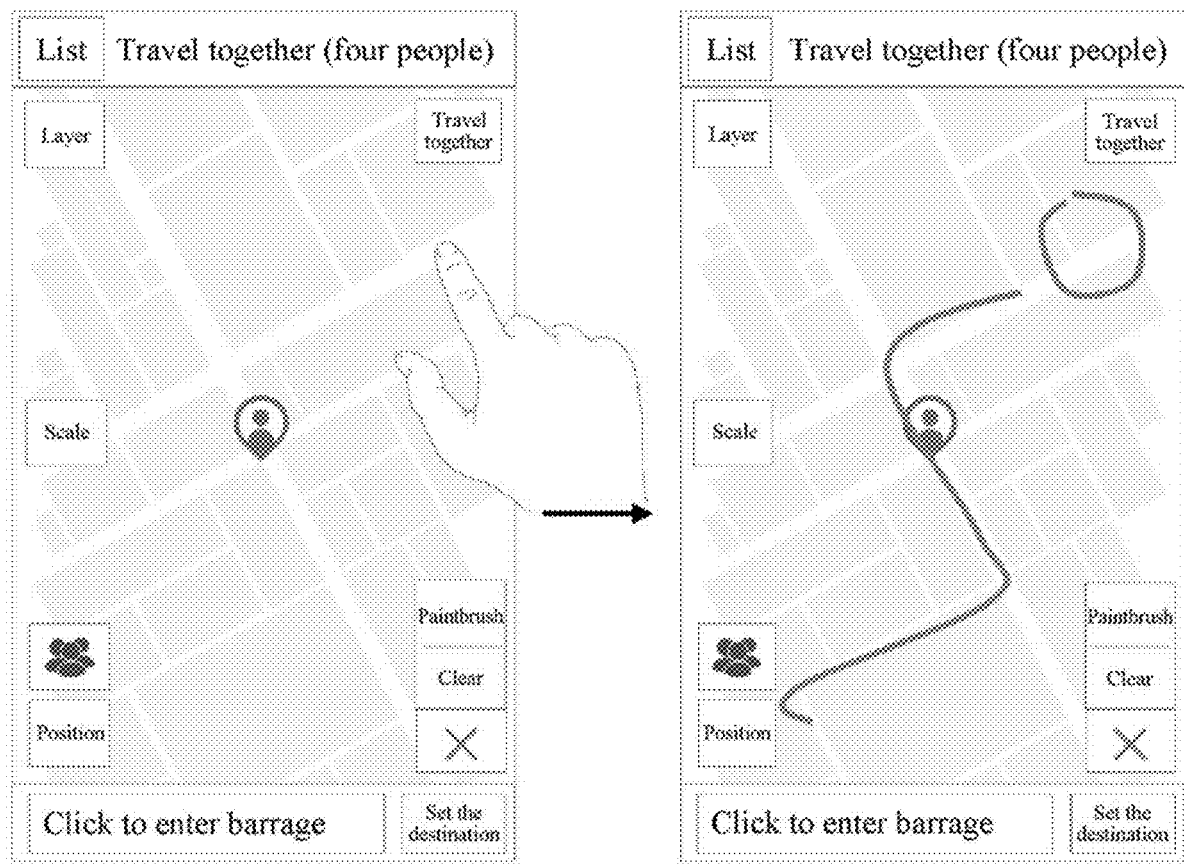
FIG. 2 illustrates a schematic effect diagram of route drawing according to an embodiment of the present invention.

As shown in FIG. 2, the user performs, by a finger, a sliding operation on the map displayed on the electronic device, and draws two first routes. The left side of FIG. 2 shows the map before drawing by the user, and the right side of FIG. 2 shows a schematic display diagram formed based on the user operation on the map. In the right side of FIG. 2, two first routes are formed, one first route is a broken ring-form route, and the other first route is an S-shaped route.

S110 may further include: collecting a touch or sliding operation performed by the user on an interaction display screen. The interaction display screen herein may include a touchscreen or a floating touchscreen. For example, finger sliding shown in FIG. 2 is the user operation.

In S120, route drawing is performed on the first map according to the user operation, to form the first route. For example, the user slides, by the finger, on the first map displayed on the touchscreen, and the first device draws a first route on a corresponding location on which the user slides by the finger, where the first route is the same as a sliding track of the user finger. Certainly, if the user slides using a mouse to form a movement track of a mouse icon, in S120, a route is drawn according to the movement track of the mouse icon and on the first map displayed on the first electronic device.

In S130, the extracting route information of the first route may include: extracting information about coordinates of the first route on the first map.

In one embodiment, in S140, the first location information corresponding to Y points on the first route are extracted based on the route information, where Y is an integer not less than 2. Usually, when Y is 2, two pieces of first location information are geographical location information of a start location and a destination location of the first route. In S140, geographical location information corresponding to the information about coordinates on the first route may be determined by various positioning operations such as a global positioning system (GPS). In one embodiment, the first location information may include the geographical location information.

For example, each point on the first route on the first map may correspond to a specific geographical location. In one embodiment, geographical locations corresponding to some or all points on the first route may be extracted to form the first location information. For example, assuming that the first route may approximately include N points under the current processing precision of the first map, in S140, the first location information of the Y points is extracted, here Y is an integer not less than N. The first location information may be various information such as latitude and longitude information or geographical name information of the Y points, and is information that can mark a geographical location.

In S150, the first location information is sent to the second electronic device, and the second electronic device herein is another terminal different from the first electronic device. In one embodiment, usually, the first electronic device sends the first location information to the second electronic device by the network platform. For example, the first electronic device and the second electronic device both may be connected to a map application platform, the first electronic device sends the first location information to the map application platform, and the map application platform forwards the first location information to the second electronic device. In this way, after receiving the first location information, the second electronic device draws, according to the first location information, a route on the second map displayed on the second electronic device, and the route may be referred to as the second route in one embodiment. There is a correspondence between the second route and the first route, and the correspondence may be represented as that each of the first route and the second route includes at least the Y points. The geographical locations corresponding to the Y points representing the first route are also included on the second route. Start locations of the first route and the second route are different and destination locations of the first route and the second route are different. Certainly, during specific implementation, because the scale of the first map may be different from the scale of the second map, lengths and thickness of the first route and the second route on the display screen may be different. Or there may be certain error between the location information corresponding to points on the first route and that corresponding to points on the second route, because the processing precision of the first map of the first electronic device and the processing precision of the second map of the second electronic device may be different.

In one embodiment, S150 may include: synchronizing the first location information to the second electronic device in real time. In this way, the second electronic device can synchronously display the second route corresponding to the first route on the first map displayed on the first electronic device. In this way, when the user A holding the first electronic device guides the user B holding the second electronic device, if the user A draws a first route from a start location S1 to a destination location S2 on the first map on the first electronic device, by operations in S120 and S130, the second electronic device may synchronously receive the first location information sent by the first electronic device, and draw a second route from the start location S1 to the destination location S2 on the second map on the second electronic device. In addition, the shape extended by the second route and the shape extended by the first route are the same, while only sizes and thickness may be different.

Figure 3:
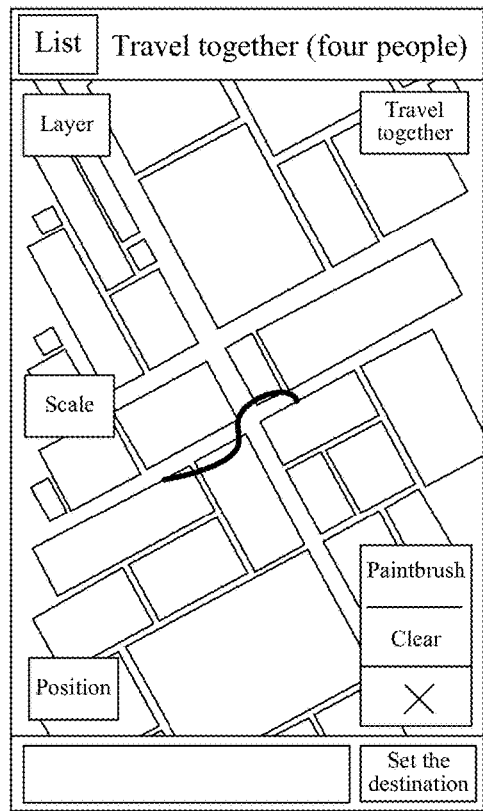
FIG. 3 illustrates a schematic effect diagram of route sharing according to an embodiment of the present invention.
Figure 3:
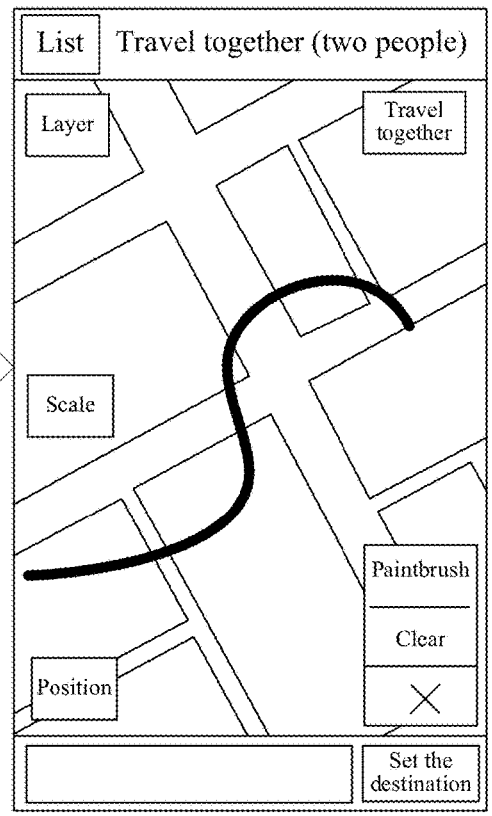

As shown in FIG. 3, the first electronic device draws the first route, and synchronizes the first location information of the Y points on the first route to the second electronic device. The second electronic device draws, on the second map, the second route corresponding to the first route. As can be learned from FIG. 3, shapes of the first route and the second route are the same, and locations on the first route and the second route are the same, but the first route is obviously smaller than the second route.

In this way, during route sharing, a peer electronic device (the peer electronic device herein is the second electronic device) does not receive information opened as an image or in HTML5, at least two pieces of first location information are sent to the peer electronic device, and the second route is drawn on the map again. If the user needs to further view a detailed address on the route, the user may scale up the route on the second map, thereby improving the sharing effect, and avoiding a poor sharing effect caused by the inflexibility and inoperability of information sharing caused by image sharing and sharing in HTML5.

In some embodiments, the method further includes: determining a number X of the first routes and Y based on a performance parameter of the first electronic device and/or a parameter of the network to which the first electronic device is connected, where X is an integer not less than 1, and Y is the number of points for extracting the first location information from each first route.

In one embodiment, the performance parameter of the first electronic device may include any parameter that can represent information processing of the first electronic device, for example, a processing rate of a central processing unit (CPU), a buffer capacity parameter, and a current load rate of the CPU. The parameter of the network to which the first electronic device is connected may include a network type parameter. For example, the network parameter may be used to represent information such as whether the first electronic device is connected to the Internet by Wireless Fidelity (WiFi) or by mobile data, whether the first electronic device is connected to the network by wired connection or wireless connection, and a network bandwidth of the network to which the first electronic device is connected.

For example, the resource consumed for drawing one first route, and the resource consumed for extracting first location information of a point from one first route further need to be considered when X and Y are determined, and a group of candidate values of X and Y are determined with reference to the performance parameter. In addition, another group of candidate values of X and Y are determined according to a data amount generated when Y points are extracted from the X first routes and the network parameter. During implementation, a group of smaller values may be selected from the two groups of candidate values, and are used as final values of X and Y.

Certainly, during specific implementation, X and Y may be determined only based on the performance parameter or the network parameter, rather than considering both the performance parameter and the network parameter.

Certainly, when X and Y are determined based on the performance parameter, the heavy load caused in a process in which the first electronic device makes the route information interaction, and a frame freezing phenomenon caused by a large response delay can be avoided.

Certainly, when X and Y are determined based on the network parameter, a phenomenon that the second electronic device cannot receive the first location information in time because the transmission speed is excessively slow can be reduced, and the transmission delay can be reduced.

Thus, by determining the values of X and Y, the problems of unsmooth information processing, the large delay, and the large data flow consumed in an exchange process of the route information can be avoided.

In some embodiments, the method further includes: collecting a processing operation performed on the first route; performing a first processing operation on the first route according to the processing operation; generating operation information according to the processing operation; and providing the operation information for the second electronic device, where the operation information is used for the second electronic device to perform a second processing operation corresponding to the first processing operation on the second route.

The first processing operation in one embodiment may include an operation, for example, deleting the first route, modifying the first route, re-drawing another first route, or marking the first route.

In one embodiment, the collected operation processing performed on the first route may include a user operation collected by a human-computer interaction interface. For example, the user operation is collected by the interaction display screen, and various user operations such as a sliding operation and a clicking operation are detected.

The processing operation may include various operations performed on the first route, such as a modification operation, a deletion operation, and a re-drawing operation. The first electronic device may further generate operation information according to the processing operation when processing the first route in response to the operation processing. The operation information may include an operation instruction or an operation parameter of the first operation. The operation instruction may include a deletion instruction, a modification instruction, an update instruction, a drawing instruction, or the like. The operation parameter may include an identifier of a deleted route, and the identifier is used to indicate a specific first route that is to be deleted, and may further include information such as original coordinates of points on the modified first route.

In one embodiment, the operation information is sent to the second electronic device, so that the second electronic device performs a second processing operation corresponding to the first processing operation on the second route according to the operation information.

For example, if the first electronic device deletes the first route, the operation information received by the second electronic device may include information such as a deletion instruction, and the second electronic device performs information processing according to the operation information, and deletes the second route.

For example, the first electronic device receives a clearing operation, and the first electronic device sends operation information of the clearing operation to the second electronic device by a network platform (for example, a cloud platform). After receiving operation information of the clearing operation, the second electronic device may clear the second route that is generated based on the location information received by the first electronic device.

Figure 4:
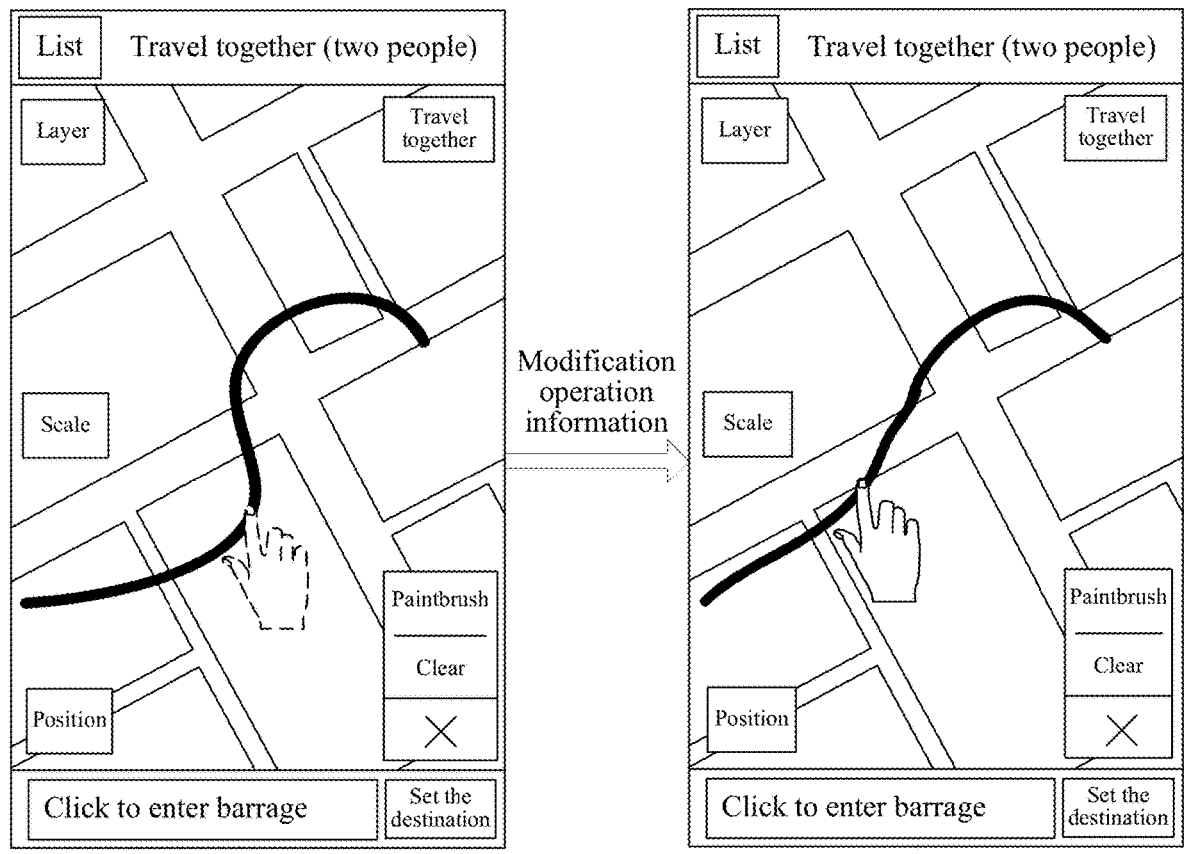
FIG. 4 illustrates another schematic effect diagram of route sharing according to an embodiment of the present invention.

For another example, the processing operation may include a modification operation. For example, a location point needing to be modified is selected by clicking the point on the first route, and the user may move some points on the first route to designated locations by a sliding operation. In this way, the user can generate a new first route without re-drawing the first route. For example, as shown in FIG. 4, the user clicks one point on the first route by a finger, and releases the finger after moving the point to a designated location. The first route formed after the electronic device responds to the clicking operation processing changes from the left figure in FIG. 4 to the route shown in the right figure in FIG. 4.

During specific implementation, usually, after receiving the processing operation and generating operation information, the first electronic device may send the operation information to the second electronic device within a designated time period. The designated time period herein usually is a relatively short duration. Generally, after generating the operation information, the first electronic device immediately synchronizes the operation information with the second electronic device via the network platform. In this way, the second electronic device can be synchronized with the first electronic device in time, and obtain various route information drawn on the first map on the first electronic device.

It should be noted that the route sharing method in one embodiment is a further improvement based on the route sharing method described above. Certainly, X and Y in one embodiment may be determined by using the above methods. Further, in a specific implementation process, X and Y may also be set using default settings when the electronic device is manufactured or by the map application.

In some embodiments, the method further includes: collecting a processing operation performed on the first route, where the collected processing operation may include: collecting a route interaction operation based on a first location on the first route, and generating route interaction information; performing a first processing operation on the first route according to the processing operation; generating operation information according to the processing operation; and providing the operation information for the second electronic device, where the providing the operation information for the second electronic device may include: providing the route interaction information and second location information of the first location for the second electronic device.

The operation information is used for the second electronic device to perform a second processing operation corresponding to the first processing operation on the second route. The route interaction information is displayed by the second electronic device on the second map. Certainly, it should be noted that in addition to the route interaction information, the operation information may further include other operation information.

Figure 5:
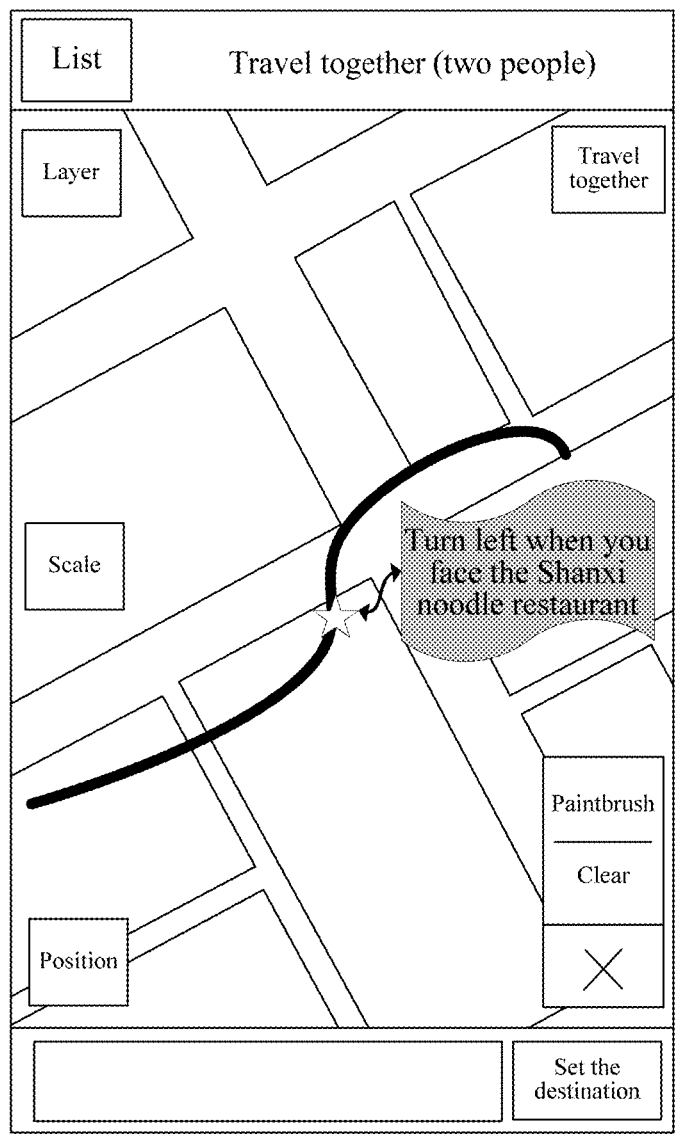
FIG. 5 illustrates a schematic effect diagram of responding to a route interaction operation according to an embodiment of the present invention.

As shown in FIG. 5, the point selected by the star corresponds to the first location, and a human-computer interaction device of the first electronic device further receives information inputted by a user. In an example provided in FIG. 5, text entered by the user may include: "Turn left when you face the Shanxi noodle restaurant". By implementing the information interaction method in one embodiment, the display effect is achieved after the first processing operation is performed on the first route according to the processing operation. The route interaction information is displayed at the first location on the first route.

In one embodiment, the route interaction information may further be synchronized to the second electronic device by a communications link or the network platform. In this way, the second electronic device may display the route interaction information on the corresponding location, so that the user is better guided.

In some embodiments, the method further includes: collecting a processing operation performed on the first route; performing a first processing operation on the first route according to the processing operation; generating operation information according to the processing operation; and providing the operation information for the second electronic device, where the operation information is used for the second electronic device to perform a second processing operation corresponding to the first processing operation on the second route.

The first processing operation in one embodiment may include an operation, for example, deleting the first route, modifying the first route, re-drawing another first route, or marking the first route.

The method further includes: generating historical record information; the collecting a processing operation performed on the first route includes: collecting a route recovery operation; and the performing a first processing operation on the first route according to the processing operation includes: responding to the route recovery operation, and controlling, based on the historical record information, recovery of display of a historical route on the first map.

The historical record information in one embodiment may include information about each first route drawn within a period of time preceding current time. In one embodiment, the first electronic device may further respond to the route recovery operation and recover display of the historical route.

In this way, the first electronic device may further send historical route recovery operation information generated according to the historical route recovery operation to the second electronic device, so that the second electronic device also recovers display of the second route corresponding to the first route of the first electronic device.

In this way, the first electronic device and the second electronic device implement recovery by route clearing, thereby satisfying a requirement of the user of searching for a historical route, better using software and hardware resources of the first electronic device and the second electronic device, and improving the effective resource utilization of the first electronic device and the second electronic device.

In some embodiments, the method further includes: establishing a communications link between the first electronic device and the second electronic device, and S150 may include: sending the first location information to the second electronic device by the communications link.

In one embodiment, the first electronic device and the second electronic device may establish various communications links. For example, a persistent connection is established between the first electronic device and the second electronic device. Certainly, the communications link between the first electronic device and the second electronic device may further include: creating a sharing-relationship record on the network platform. In this way, after receiving the first location information sent by the first electronic device, a network electronic device may determine, by the sharing-relationship record, the second electronic device receiving the first location information. In one embodiment, there may be multiple manners of establishing the communications link between the first electronic device and the second electronic device, and certainly, the present disclosure is not limited to the foregoing two manners.

In one embodiment, the communications link is established between the first electronic device and the second electronic device, so that the first location information can be transmitted conveniently and targetedly, facilitating display of the second route on the second map displayed on the second electronic device.

Figure 6:
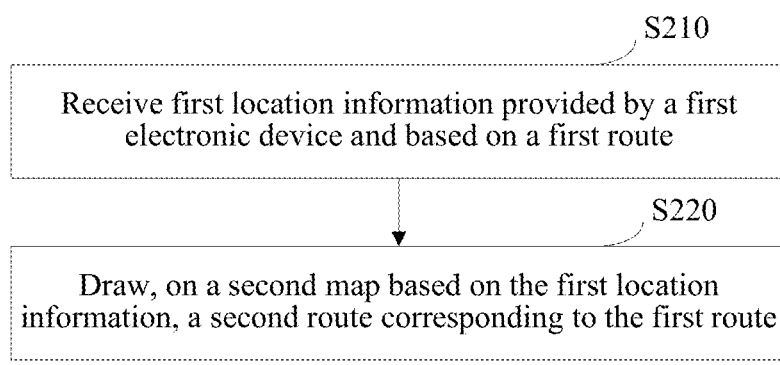
FIG. 6 illustrates a schematic flowchart of another route sharing method according to an embodiment of the present invention.

As shown in FIG. 6, an embodiment provides a route information sharing method. The method is applied to a second electronic device, and includes the followings.

S210: Receiving first location information provided by a first electronic device and based on a first route.

S220: Drawing, on a second map based on the first location information, a second route corresponding to the first route.

In one embodiment, the second electronic device receives the first location information sent by the first electronic device, and draws, on the second map displayed on the second electronic device, the second route corresponding to the first route, thereby implementing route sharing.

S210 may include: receiving the first location information directly from the first electronic device, or receiving the first location information sent by the first electronic device and forwarded by another electronic device, for example, receiving, from a network platform, the first location information sent by the first electronic device.

In S220, the second route corresponding to the first route is drawn on the second map based on the first location information.

In one embodiment, during route sharing, the second electronic device directly receives the first location, but does not receive an image file or information that can be opened only in HTML5 in the existing technology. After the first location information is received, the second route is drawn based on the first location information. In this way, when a user views the second route, the user may scale the second route by a map operation, so that detailed content is viewed conveniently, software and hardware resources of the second electronic device is better used, the effective utilization of the electronic device is improved, and the better sharing effect is achieved.

In some embodiments, the method further includes: receiving operation information of the first electronic device for the first route, where the operation information is operation information of performing a first processing operation for the first route; and performing a second processing operation corresponding to the first processing operation on the displayed second route according to the operation information.

In one embodiment, the operation information is further received. The operation information may include operation information of various operations such as a deletion operation, a clearing operation, a modification operation, an update operation, and an interaction operation.

The second electronic device receives the operation information for the first route from the first electronic device. In this way, when the second electronic device performs the first processing operation in response to the processing operation, the second electronic device may perform the second processing operation corresponding to the first processing operation, so that route processing by the first electronic device is synchronized with route processing by the second electronic device.

For example, the receiving operation information of the first electronic device for the first route further includes: receiving route interaction information and second location information that are provided by the first electronic device, where the second location information is location information of the first location on the first route; and displaying, on the second route according to the route interaction information and the second location information, the route interaction information at a second location corresponding to the first location.

If FIG. 5 shows a schematic display diagram of the second electronic device, the point corresponding to the star in FIG. 5 is the second location. "Turn left when you face the Shanxi noodle restaurant" shown in FIG. 5 is the interaction content of the route interaction information shared between the first electronic device and the second electronic device. In one embodiment, by sharing the route interaction information, route sharing and guiding are better performed, and intuitive and simplicity of the route sharing and guiding can be improved. In addition, software and hardware resources of the first electronic device and the second electronic device are better used, and resource utilization of the first electronic device and the second electronic device are improved.

Figure 7:
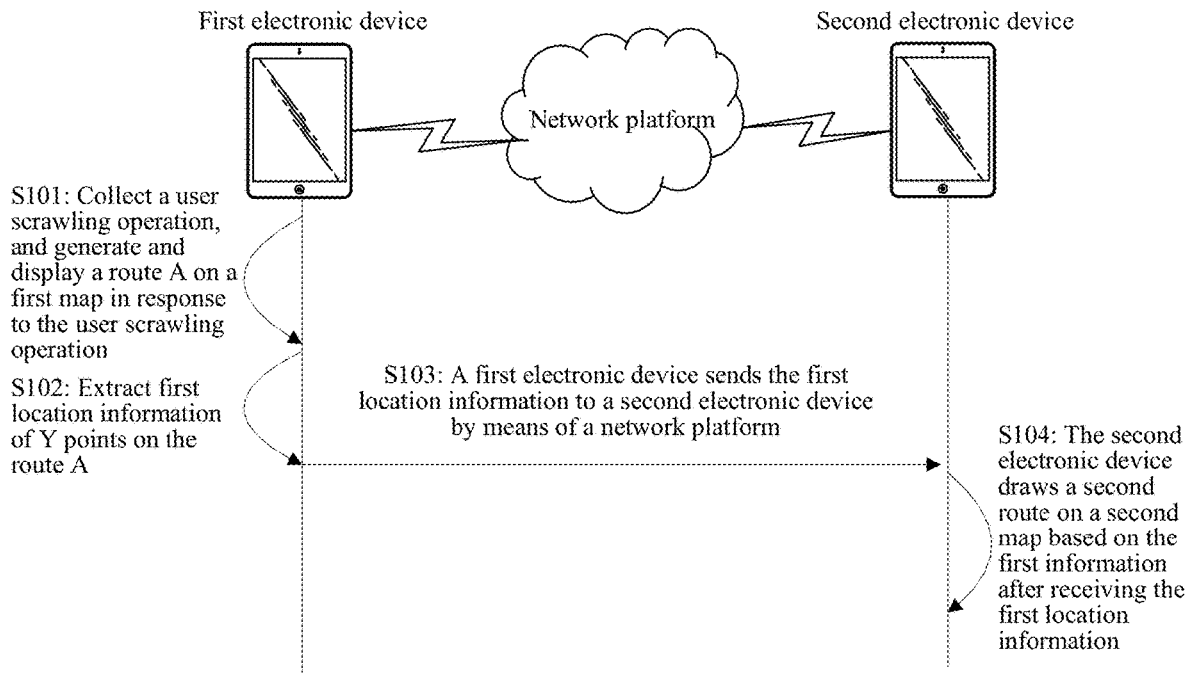
FIG. 7 illustrates a schematic flowchart of another route sharing method according to an embodiment of the present invention.

The following provides a specific application example with reference to the foregoing embodiments. As shown in FIG. 7, a route information sharing method in this example includes the followings.

S101. Collecting a user drawing or scrawling operation, and generating and displaying a route A on a first map in response to the user drawing operation, where the route A is equivalent to the first route, the user drawing operation is the user operation in the foregoing embodiments, the user operation may include a touch operation or a floating touch operation performed on an interactive display screen.

S102. Extracting first location information of Y points on the route A.

S103. A first electronic device sends the first location information to a second electronic device by a network platform. Specifically, the first electronic device synchronizes the first location information with the second electronic device by the network platform in real time.

S104. After receiving the first location information, the second electronic device draws a second route on a second map based on the first location information.

Figure 8:
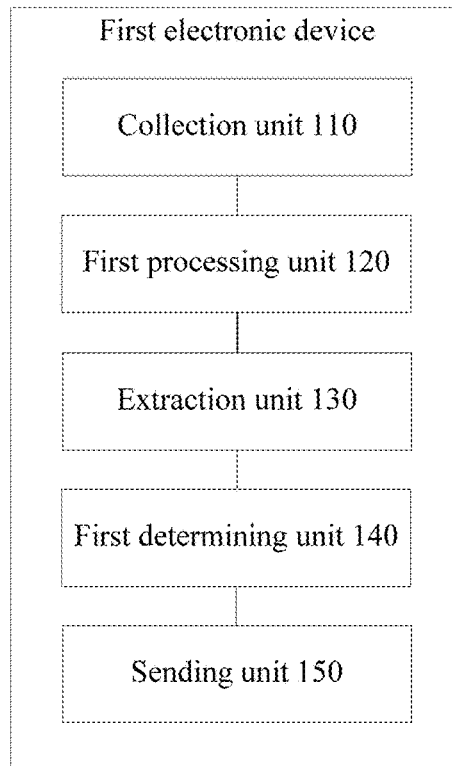
FIG. 8 illustrates a schematic structural diagram of an electronic device according to an embodiment of the present invention.

As shown in FIG. 8, an embodiment of the present invention provides an electronic device. The electronic device is a first electronic device, and includes: a collection unit 110, a first processing unit 120, an extraction unit 130, a first determining unit 140, and a sending unit 150.

The collection unit 110 may be configured to collect a user operation. The first processing unit 120 may be configured to draw, in response to the user operation, a first route on a first map displayed on the first electronic device. The extraction unit 130 may be configured to extract route information of the first route.

The first determining unit 140 may be configured to determine, based on the route information, first location information corresponding to Y points on the first route, Y being an integer not less than 2; and the sending unit 150 may be configured to provide the first location information for a second electronic device, the first location information being used for the second electronic device to draw, on a second map, a second route corresponding to the first route.

The first electronic device in one embodiment may be a terminal device such as a mobile phone, a tablet computer, or a wearable device.

The collection unit 110 may correspond to various human-computer interaction interface. The human-computer interaction interface may correspond to an interaction display unit. The interaction display unit may include a touch control display screen or a floating touch control display screen.

A structure corresponding to the first processing unit 120, the extraction unit 130, and the first determining unit 140 may correspond to a processor or a processing circuit of an electronic device such as a mobile phone or a tablet computer. The processor herein may include a processing structure such as a CPU, a microprocessor, a digital signal processor, or a programmable gate array (PGA). The processing circuit may correspond to a dedicated integrated circuit.

The processor or the processing circuit can read designated code stored in a storage medium, and executes the designated code to extract the route information of the first route and determine a first location.

The sending unit 150 may correspond to a sending interface, and the sending interface herein may correspond to a wired sending interface, or may be a wireless sending interface. The wired sending interface may include a cable interface or an optical cable interface. The wireless sending interface may be a sending interface corresponding to a WiFi antenna, or corresponding to a mobile antenna such as an evolved Node B (eNB).

In one embodiment, the sending unit 150 sends the first location information. The first location information may be sent by a direct link between the first electronic device and the second electronic device, or may be forwarded to the second electronic device by an intermediate device such as a network platform.

Thus, when the first electronic device performs route sharing, information about a location on a route, rather than information such as image information in the existing technology, is directly shared. Therefore, in this route sharing manner, the shared route is directly displayed on the map, facilitating a subsequent operation of a user, and improving the sharing effect.

The electronic device further includes a second determining unit, configured to determine a number X of the first routes and Y based on a performance parameter of the first electronic device and/or a parameter of a network to which the first electronic device is connected, where X is an integer not less than 1, and Y is a number of points for extracting the first location information from each first route.

In one embodiment, the second determining unit may correspond to a calculator, a processor having a calculation function, or a processing circuit having a calculation function. Appropriate X and Y are calculated according to the performance parameter and/or the network parameter, a resource needing to be consumed during a route sharing process, and a generated data amount. Therefore, in one aspect, the phenomenon of an unsmooth processing operation such as frame freezing of the first electronic device can be avoided. In another aspect, the problem of a large receiving delay of a peer party, that is, the second electronic device, can be avoided.

The collection unit 110 is further configured to collect a processing operation performed on the first route; the first processing unit is further configured to perform a first processing operation on the first route according to the processing operation; the first electronic device further includes: a generation unit, configured to generate operation information according to the processing operation; and the sending unit 150 is configured to provide the operation information for the second electronic device, where the operation information is used for the second electronic device to perform a second processing operation corresponding to the first processing operation on the second route.

In one embodiment, the collection unit may include various sensors for receiving user input. The collection unit herein may correspond to a sensor device for user input such as a keyboard, an interaction display screen, or a mouse, so that the processing operation performed on the first route can be collected conveniently.

The first processing unit herein may correspond to a processor or a processing circuit. For descriptions of the processor or the processing circuit, refer to the previous embodiment, and details are not described herein again.

The generation unit may also correspond to the processor or the processing circuit or a parser, so that the processing operation can be parsed, and the operation information can be generated. The operation information herein may include an operation instruction and an operation parameter corresponding to the operation instruction. The operation instruction may further be a deletion instruction, a clearing instruction, a modification instruction, or the like. The operation parameter may include a parameter value for executing the foregoing operation instruction, for example, a first route that is to be deleted, or first routes that are to be cleared may be learned according to the operation parameter. To sum up, in one embodiment, the operation information is sent, so that the second electronic device synchronously performs operation processing on the second route, thereby implementing synchronization of route sharing of the first electronic device.

Optionally, the collection unit 110 is configured to collect a route interaction operation that is based on the first location on the first route, and generate route interaction information, and the sending unit 150 is configured to provide the route interaction information and second location information of the first location for the second electronic device, where the route interaction information is displayed by the second electronic device on the second map. In one embodiment, the operation collected by the sensor may include the route interaction operation, for example, adding one of a text note, an image note, and a voice note to the first route, so that the second electronic device can better learn the route information after receiving the route interaction information. The text note may include text entered by a user of the first electronic device. The image note may include an image inserted at the first location on the first route. For example, a photo of a building that a user of the second electronic device needs to search for is inserted. The voice note may include information such as guide voice sent by the user of the first electronic device. To sum up, in one embodiment, the first electronic device can perform route sharing better by sharing the route interaction information.

Certainly, in one embodiment, the generation unit is further configured to generate historical record information, the collection unit is further configured to collect a route recovery operation, and the first processing unit is further configured to respond to the route recovery operation and control, based on the historical record information, recovery of display of a historical route on the first map.

In one embodiment, the generation unit is further configured to generate the historical record information, and the historical record information may include route information of a first route drawn before a current time point. In one embodiment, the first electronic device may further include a storage unit, and the storage unit herein may correspond to various storage mediums, and can store the historical record information. In one embodiment, the collection unit is further configured to collect the route recovery operation, for example, detect a user sliding operation, a user clicking operation, or a mouse processing operation. The first processing unit can further recovery display of the historical route, in this way, the user can view a previously-displayed route conveniently by the route recovery operation, thereby improving the intelligence of the first electronic device and use satisfaction of the user.

In one embodiment, X and Y may be determined by the second determining unit according to the performance parameter and/or network parameter, and it is not limited to the second determining unit when determining of X and Y.

The electronic device further includes a connection unit, which may be configured to establish a communications link between the first electronic device and the second electronic device, where the sending unit 150 is further configured to send the first location information to the second electronic device by the communications link.

In one embodiment, the connection unit may correspond to a communications interface, and the communications interface can establish the communications link between the first electronic device and the second electronic device. The communications link may include a persistent link, or the like. The sending unit 150 may send the first location information to the second electronic device by the communications link. In this way, the first electronic device and the second electronic device can share the route information conveniently.

Figure 9:
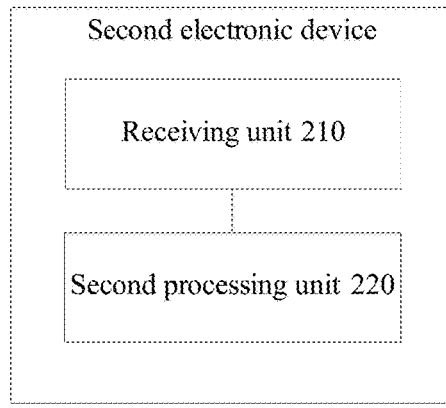
FIG. 9 illustrates a schematic structural diagram of another electronic device according to an embodiment of the present invention.

As shown in FIG. 9, an embodiment of the present invention provides another electronic device. The electronic device is a second electronic device, and includes: a receiving unit 210 and a second processing unit 220.

The receiving unit 210 is configured to receive first location information provided by a first electronic device and based on a first route; and the second processing unit 220 is configured to draw, on a second map based on the first location information, a second route corresponding to the first route.

In one embodiment, the second electronic device is an electronic device with which the first electronic device performs route sharing. The electronic device herein may be the foregoing various terminal devices, for example, a mobile phone or a tablet computer.

The receiving unit 210 may correspond to a receiving interface, and the receiving interface may include a wired interface or a wireless interface. The wired interface may be a cable interface or an optical cable interface. The wireless interface may include various receiving antennas. The receiving unit 210 may directly receive the first location information from a direct connection to the first electronic device, or may receive the first location information from an intermediate node such as a network platform.

The second processing unit 220 may correspond to a processor or a processing circuit. The processor or the processing circuit herein may be the processor or the processing circuit included in the first electronic device.

Thus, during route sharing, the second electronic device directly receives the first location information from the first electronic device, rather than image information, thereby better implementing route sharing and improving the sharing effect.

The receiving unit 210 is further configured to receive operation information of the first electronic device for the first route, where the operation information is operation information of performing a first processing operation for the first route; and the second processing unit 220 is further configured to perform a second processing operation corresponding to the first processing operation on the displayed second route according to the operation information.

In one embodiment, the second electronic device may receive not only the first location information, but also the operation information from the first electronic device. In this way, the first electronic device and the second electronic device perform corresponding operations on the route, and synchronization between the first route and the second route can be implemented after the processing.

Optionally, the receiving unit 210 is further configured to receive route interaction information and second location information that are provided by the first electronic device, where the second location information is location information of a first location on the first route; and the second electronic device further includes: a display unit, configured to display, on the second route according to the route interaction information and the second location information, the route interaction information at the second location corresponding to the first location.

In one embodiment, the display unit may correspond to various display structures belonging to the second electronic device. The display structures may include a display device such as a liquid crystal display, a projection display, an electronic ink display, or an organic light emitting diode (OLED) display, can display the second map, and display the second route and the route interaction information on the second map. In this way, the second device not only may directly display the second route corresponding to the first route during route sharing, but also may display the route interaction information, thereby better implementing an operation such as route sharing.

Thus, the second electronic device is a hardware structure that can implement the route information sharing method, and has a good route sharing effect and high intelligence.

An embodiment of the present invention further provides a computer storage medium. The computer storage medium stores a computer executable instruction, and the computer executable instruction is used to perform at least one of the foregoing route information sharing methods, for example, one or more of the methods shown in FIG. 1, FIG. 6, FIG. 7, and FIG. 11.

The computer storage medium may be random access memory (RAM), a read-only memory (ROM), a flash memory, a magnetic tape, or another type of storage medium.

Figure 10:
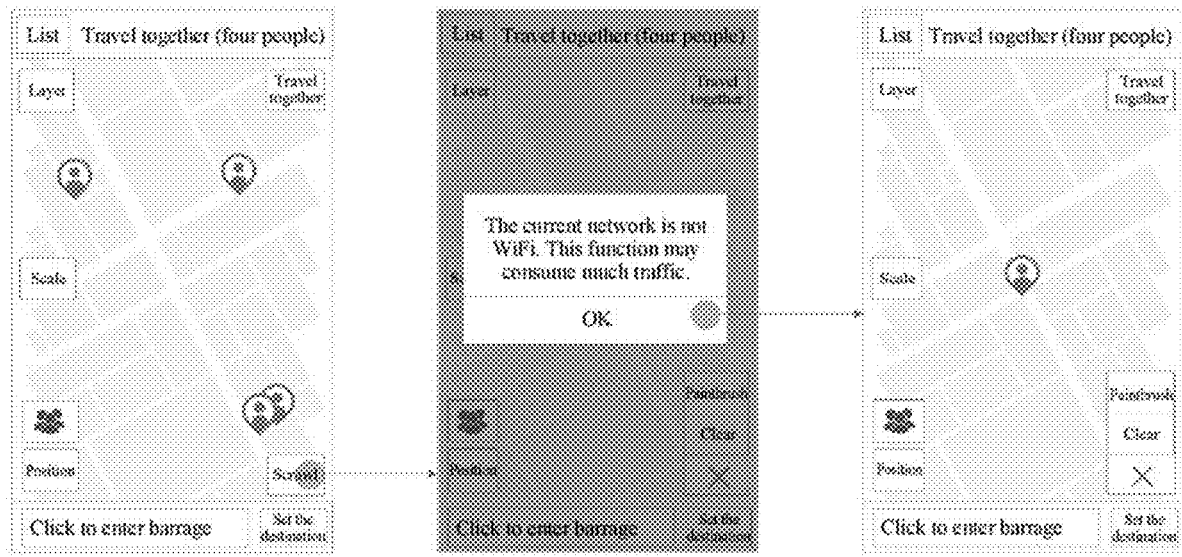
FIG. 10 illustrates a schematic interface diagram of route drawing according to an embodiment of the present invention.

The following provides several specific examples with reference to any technical solution in the foregoing embodiments. As shown in FIG. 10, one example provides a route sharing method, including the followings.

Step 1. Prompting network data consumption to a user after a first electronic device selects a drawing control based on a user operation. A prompt effect is shown in the middle figure in FIG. 10.

Step 2. The first electronic device may select a paintbrush based on the user operation, so that a first map displayed on the first electronic device is in a drawing edition state, and the first electronic device may draw a route. Each time the first electronic device successfully draws a route based on the user operation, the first electronic device sends the route to a cloud, and synchronizes the route to another electronic device in real time. After the first electronic device draws the route, the first electronic device may clear the drawn route based on the user operation, or may clear all routes on a current map. Two application scenarios are provided based on the foregoing operation.

Scenario 1. Scrawling to provide guidance. User A draws a line on the first map on the first electronic device. User B (and another user with who the user A shares a location) may see the line in time on a second map displayed on a second electronic device of user B, and finds a destination by the line.

Scenario 2. Interacting for entertainment. User A draws any graph (the shape is identified on the map) on the first map. User B (and another user with who the user A shares a location) may see the graph in time on a second map displayed on a second electronic device, and scrawls together for interaction and entertainment.

There are certain function features. For example, the user A and the user B may be in different modes. The route can be displayed on a map (a 2D map) of a guiding person and on navigation (a 3D map) of a guided person at the same time, and the guiding person and the guided person are in different scales. For example, the guiding person performs guiding by route drawing and sharing on the first map whose scale is 1:10, and the guided person may also see the route on the second map whose scale is 1:200.

Figure 11:
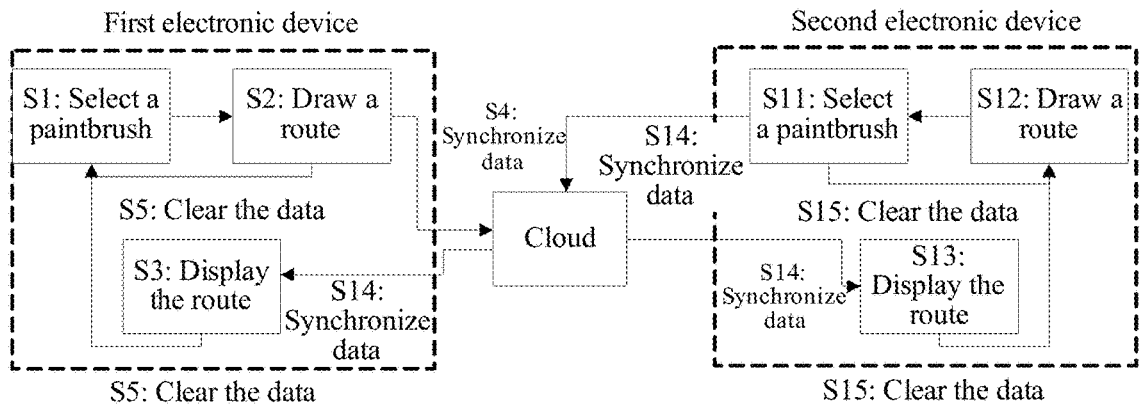
FIG. 11 illustrates a schematic flowchart of another route sharing method according to an embodiment of the present invention.

As shown in FIG. 11, one example provides a route sharing method, including the followings.

S1: A first electronic device selects a paintbrush.
S2: Drawing a route.
S3: Displaying the route.

S4: Synchronizing data, where the data is first synchronized to a cloud, and then, is synchronized to a second electronic device from the cloud. The cloud may be equivalent to the network platform in the foregoing embodiment, and the synchronized data herein includes at least the first location information in the foregoing embodiments.

S5: Clearing the data, where the clearing the data may include clearing various drawn routes.

During specific execution of S3, S2, and S4, S2 may be performed first, S3 is performed then, and S4 is performed finally; or S2, S3, and S4 may be performed synchronously, that is, the first electronic device draws the route, displays the route, and sends the route at the same time, to implement data synchronization. However, to avoid problems of unsmooth processing and the like of the first electronic device, a method performed in a sequence of S2, S3, and S4 is used preferably.

S11: Selecting a paintbrush.
S12: Drawing a route.
S13: Displaying the route.
S14: Synchronizing data, where the data is first synchronized to a cloud, and then, is synchronized to the first electronic device from the cloud.
S15: Clearing the data, where the clearing the data may include clearing various drawn routes.

In this example, each of the first device and the second device may be a sharing end or a shared end, to implement route sharing. The following describes in detail the foregoing operations.

The selecting a paintbrush may include: Selecting color and thickness of a scrawl or draw paintbrush.

The drawing a route may include: Performing a drawing operation on a map based on a user operation, and obtain GPS information according to a track of the paintbrush. Considering the engine and network overheads, a maximum of X (which changes according to the engine and network overheads) lines are drawn on each map, each route includes a maximum of Y GPS points (which change according to the engine and network overheads), or a line drawn each time includes X*Y GPS points.

The following describes a method for measuring X and Y.

Two factors are mainly considered. The first is a device performance factor, and the second is a network performance factor. These factors may be measured by certain tests. The value of X*Y of each user varies dynamically according to the two factors.

Device performance test: CPU overheads are different when routes are drawn on different mobile phones, values of X and Y vary dynamically according to different device performance, and testing is performed according to a model. Using iPhone4s as an example for testing, after a number of points drawn on a route reaches X*Y, the CPU overheads increase sharply, and obvious frame freezing can be seen. This limit value is used as a value of X*Y for this model, and different limitations may be set to different models, to satisfy optimal performance of the model. In this example, the device performance is tested to obtain the parameter, that is, the foregoing performance parameter.

Network performance test: coordinates of collected GPS information are represented by using integer values, and each sampling point includes latitude and longitude coordinates, that is, each sampling point occupies 8 bytes. In this case, a point transmitted at the background each time is 8*X*Y. a maximum value of a sampling point is configured in real time according to a collected network type used by a user, thereby ensuring that overheads are reduced for the user when the user uses mobile data. The network performance is tested to obtain a parameter, that is, the foregoing network parameter.

The synchronizing data may include: A route drawn on a map of each electronic device is synchronized to another electronic device by the cloud. Each client pushes cloud data periodically, parses the data into a route, and draw the route on a map by an engine. Multiple users may perform operations at the same time, and each user uploads a drawn collection point to the cloud. The client pushes the cloud data in real time, performs drawing by the engine, and displays a result in real time after the drawing is completed.

Route display: When users scrawl routes manually, geographical locations displayed on the map are different. Therefore, the users can see only routes that can be displayed within respective currently-set geographical areas, and when the users move or scale the routes, the remaining routes may further be displayed.

Data clearing: A data status herein is a route status. An electronic device may clear scrawl data based on a user operation, and may clear a route drawn by another device. Cleared data is synchronized to the cloud in real time, and is synchronized to another electronic device by the cloud. In addition, to avoid clearing of valid data, the user may further recover the cleared data, for example, recover previous piece of cleared data or recover a previous clearing operation. both a party of cleared data and a clearing party can recover data, and the data is synchronized to the cloud after recovery, and then, is synchronized to another user.

Figure 12:
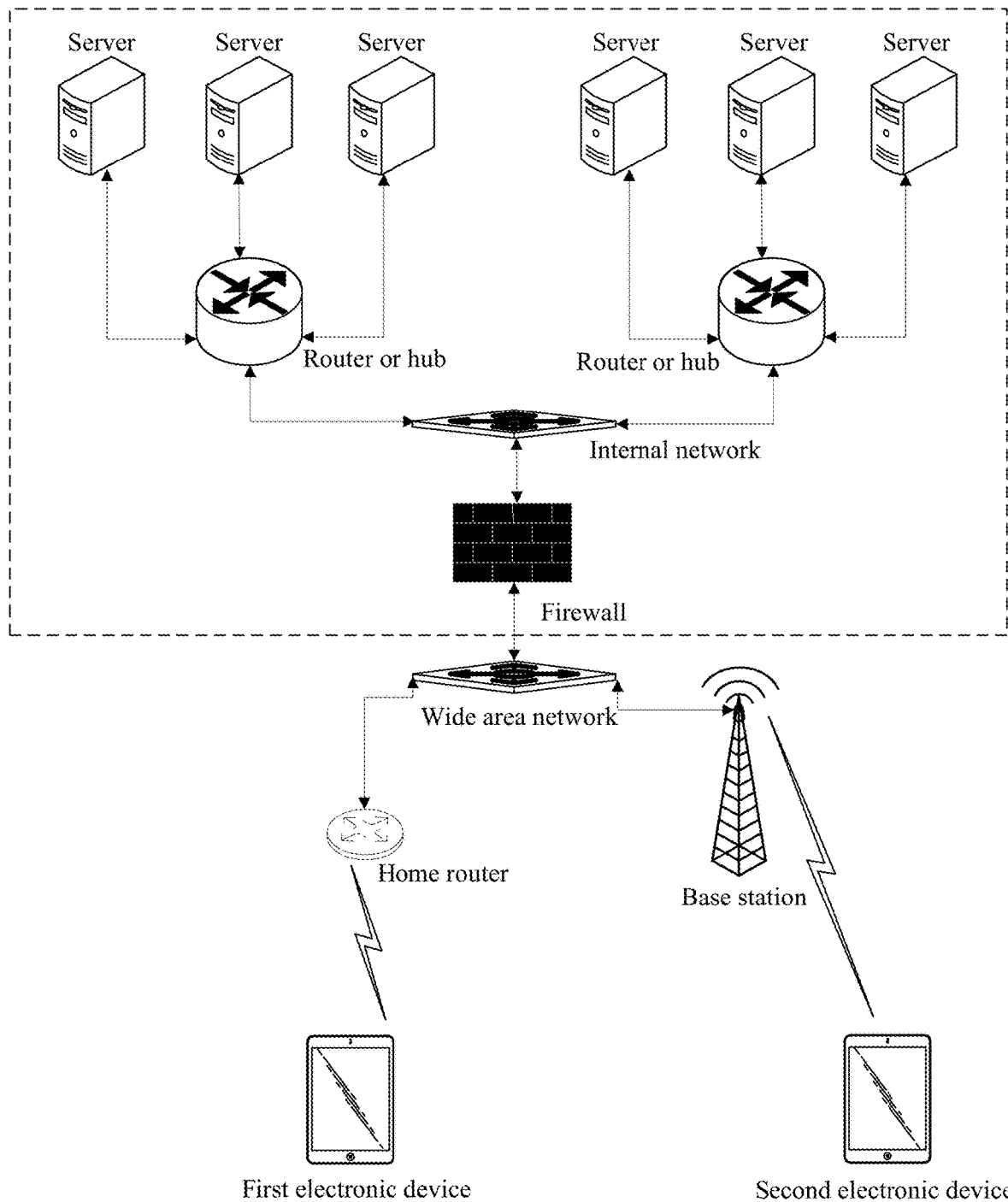
FIG. 12 illustrates a schematic structural diagram of an information system capable of implementing the route sharing methods in the embodiments of the present invention.

As shown in FIG. 12, one example further provides an information processing system that can implement the foregoing route sharing method. The system includes a network platform, a first electronic device, and a second electronic device.

The network platform may include at least one server. The information processing system shown in FIG. 12 includes multiple servers. The servers are connected by a router or a hub, and may be connected by an upper-layer network device of the router or the hub, to form an internal network of a service platform. The service platform is connected to a wide area network by a firewall.

Both the first electronic device and the second electronic device may be connected to the wide area network by routers, and are further connected to the service platform, or may be connected to the wide area network by base stations. In FIG. 12, the first electronic device is connected to the wide area network by a home router, so as to be connected to the network platform. The second electronic device is connected to the wide area network by the base station, so as to be connected to the network platform.

The first electronic device and the second electronic device may share route information by the network platform, so that a first route on a first map of the first electronic device is drawn on a second map of the second electronic device by transmission of first location information, to draw a second route corresponding to the first route.

In the several embodiments provided in the present application, it should be understood that the disclosed electronic device and method may be implemented in other manners. For example, the described electronic device embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by some interfaces. The indirect couplings or communication connections between the electronic devices or units may be implemented in electronic, mechanical, or other forms.

The units described as separate units may be or may not be physically separate. Components displayed as units may be or may not be physical units, that is, may be located at one place, or may be distributed on multiple network elements. Some or all units may be selected according to an actual requirement, to achieve an objective of the solution in the embodiments.

In addition, the function units in the embodiments of the present invention may be integrated into one processing module, or each unit may be one unit, or two or more units are integrated into one unit. The integrated unit may be implemented in a form of hardware, or may be implemented in a form of hardware plus a software function unit.

A person of ordinary skill in the art may understand that all or some steps in the method embodiments may be implemented by hardware related to a program instruction. The program may be stored in a computer readable storage medium, and when the program is executed, the steps including the method embodiments may be performed. The storage medium includes any medium that can store program code, for example, a movable storage electronic device, a ROM, a RAM, a magnetic disk, or an optical disc.

The foregoing descriptions are merely specific implementations of the present disclosure, but the protection scope of the present disclosure is not limited thereto, and any modification made according to the principle of the present disclosure shall fall within the protection scope of the present disclosure.

What is claimed is:

1. A route information sharing method, comprising:
   collecting a user operation on a first electronic device using a human-computer interaction interface;
   in response to the user operation, drawing a first route on a first map displayed on the first electronic device, wherein the first route starts at a first start location and ends at a first destination location, wherein drawing the first route includes:
   receiving, by the first electronic device, identification of the first start location and the first destination location via a contact of a screen of the first electronic device by a user's finger or via tracking on the screen of a mouse icon; and
   drawing, by the first electronic device, the first route to start at the first start location and to end at the first destination location identified by the user's finger or the mouse icon;
   determining first location information based on the first route and one or both of a performance parameter of the first electronic device and a parameter of a network the first electronic device is connected to, the first location information including information on Y points on the first route, Y being an integer not less than 2; and
   providing the first location information for a second electronic device, the first location information being used for the second electronic device to draw, on a second map, a second route corresponding to the first route, wherein the second route includes the Y points also included in the first route and ends at a second destination location different than the first destination location of the first route.

2. The method according to claim 1, further comprising:
   collecting a processing operation performed on the first route;

performing a first processing operation on the first route according to the processing operation;
generating operation information according to the processing operation; and
providing the operation information for the second electronic device, wherein the operation information is used for the second electronic device to perform a second processing operation corresponding to the first processing operation on the second route.

3. The method according to claim 2, wherein the collecting a processing operation performed on the first route further comprises:
collecting a route interaction operation based on a first location on the first route, and generating route interaction information; and
the providing the operation information for the second electronic device comprises: providing the route interaction information and second location information of the first location for the second electronic device, wherein the route interaction information is displayed by the second electronic device on the second map.

4. The method according to claim 2, wherein the method further comprises:
generating historical record information;
the collecting a processing operation performed on the first route comprises: collecting a route recovery operation; and
the performing a first processing operation on the first route according to the processing operation comprises: responding to the route recovery operation, and controlling, based on the historical record information, recovery of display of a historical route on the first map.

5. The method according to claim 2, further comprising:
receiving, by the second electronic device, the first location information provided by the first electronic device and based on the first route; and
drawing, by the second electronic device, the second route corresponding to the first route on the second map based on the first location information.

6. The method according to claim 5, further comprising:
receiving, by the second electronic device, the operation information of the first electronic device for the first route; and
performing, by the second electronic device, the second processing operation corresponding to the first processing operation on the displayed second route according to the operation information.

7. The method according to claim 6, wherein the receiving operation information of the first electronic device for the first route further comprises:
receiving route interaction information and second location information that are provided by the first electronic device, wherein the second location information is location information of a first location on the first route; and
displaying the route interaction information at a second location corresponding to the first location on the second route according to the route interaction information and the second location information.

8. An electronic device, comprising: a memory storing instructions; and a processor coupled to the memory and, when executing the instructions, configured for:
collecting a user operation on the electronic device using a human-computer interaction interface;
in response to the user operation, drawing a first route on a first map displayed on the electronic device, wherein the first route starts at a first start location and ends at a first destination location, wherein drawing the first route includes:
receiving, by the first electronic device, identification of the first start location and the first destination location via a contact of a screen of the first electronic device by a user's finger or via tracking on the screen of a mouse icon; and
drawing, by the first electronic device, the first route to start at the first start location and to end at the first destination location identified by the user's finger or the mouse icon;
determining first location information based on the first route and one or both of a performance parameter of the first electronic device and a parameter of a network the first electronic device is connected to, the first location information including information on Y points on the first route, Y being an integer not less than 2; and
providing the first location information for a remote electronic device, the first location information being used for the remote electronic device to draw, on a second map, a second route corresponding to the first route, wherein the second route includes the Y points also included in the first route and ends at a second destination location different than the first destination location of the first route.

9. The electronic device according to claim 8, wherein the processor is further configured for:
collecting a processing operation performed on the first route; performing a first processing operation on the first route according to the processing operation;
generating operation information according to the processing operation; and
providing the operation information for the remote electronic device, wherein the operation information is used for the remote electronic device to perform a second processing operation corresponding to the first processing operation on the second route.

10. The electronic device according to claim 9, wherein the collecting a processing operation performed on the first route further comprises:
collecting a route interaction operation based on a first location on the first route, and generating route interaction information; and
the providing the operation information for the remote electronic device comprises: providing the route interaction information and second location information of the first location for the remote electronic device, wherein the route interaction information is displayed by the remote electronic device on the second map.

11. The electronic device according to claim 9, wherein the processor is further configured for generating historical record information, wherein the collecting a processing operation performed on the first route comprises:
collecting a route recovery operation; and wherein the performing a first processing operation on the first route according to the processing operation comprises: responding to the route recovery operation, and controlling, based on the historical record information, recovery of display of a historical route on the first map.

12. The electronic device according to claim 8, wherein the processor is further configured for establishing a communications link between the electronic device and the remote electronic device; and wherein the providing the first location information for a remote electronic device comprises: sending the first location information to the remote electronic device by the communications link.

13. A non-transitory computer-readable storage medium containing computer-executable instructions for, when executed by one or more processors, performing a route information sharing method, the method comprising:
collecting a user operation on a first electronic device using a human-computer interaction interface;
in response to the user operation, drawing a first route on a first map displayed on the first electronic device, wherein the first route starts at a first start location and ends at a first destination location, wherein drawing the first route includes:
receiving, by the first electronic device, identification of the first start location and the first destination location via a contact of a screen of the first electronic device by a user's finger or via tracking on the screen of a mouse icon; and
drawing, by the first electronic device, the first route to start at the first start location and to end at the first destination location identified by the user's finger or the mouse icon;
determining first location information based on the first route and one or both of a performance parameter of the first electronic device and a parameter of a network the first electronic device is connected to, the first location information including information on Y points on the first route, Y being an integer not less than 2; and
providing the first location information for a second electronic device, the first location information being used for the second electronic device to draw, on a second map, a second route corresponding to the first route, wherein the second route includes the Y points also included in the first route and ends at a second destination location different than the first destination location of the first route.

14. The non-transitory computer-readable storage medium according to claim 13, the method further comprising:
collecting a processing operation performed on the first route;
performing a first processing operation on the first route according to the processing operation;
generating operation information according to the processing operation; and
providing the operation information for the second electronic device, wherein the operation information is used for the second electronic device to perform a second processing operation corresponding to the first processing operation on the second route.

15. The non-transitory computer-readable storage medium according to claim 14, wherein the collecting a processing operation performed on the first route further comprises:
collecting a route interaction operation based on a first location on the first route, and generating route interaction information; and
the providing the operation information for the second electronic device comprises: providing the route interaction information and second location information of the first location for the second electronic device, wherein the route interaction information is displayed by the second electronic device on the second map.

16. The method according to claim 1, further comprising:
clicking on the first route, by a finger of a user of the first electronic device, to form a modified first route different in route shape than the first route; and
outputting the modified first route to the second electric device.

17. The method according to claim 1, wherein the user operation includes drawing a sliding track of the user's finger or a movement track of the mouse icon, and wherein drawing the first route on the first map displayed on the first electronic device includes:
drawing, by the first electronic device, the first route on the first map according to the sliding track of the user finger or the movement track of the mouse icon.

18. The method according to claim 1, wherein the second route differs in thickness than the first route.

* * * * *